United States Patent [19]

Richardson

[11] Patent Number: 5,042,208
[45] Date of Patent: Aug. 27, 1991

[54] CONCRETE WALL FINISHING MACHINE

[76] Inventor: Lake Richardson, 4245 Avenue J, Fort Worth, Tex. 76105

[21] Appl. No.: 462,695

[22] Filed: Jan. 9, 1990

[51] Int. Cl.⁵ .................... B24B 23/00; B24B 27/033
[52] U.S. Cl. .................................... 51/180; 51/170 T
[58] Field of Search ................. 51/180, 170 T, 174, 51/177

[56] References Cited

U.S. PATENT DOCUMENTS

| | | | |
|---|---|---|---|
| 1,430,387 | 9/1922 | Krall | 144/2 R |
| 1,932,319 | 10/1933 | Myers | 51/177 |
| 2,326,264 | 8/1943 | Steltzer | 51/180 |
| 2,674,117 | 4/1954 | Butler | 15/235.4 |
| 2,787,096 | 4/1957 | Riddels | 51/180 |
| 3,348,342 | 10/1967 | Zacheck | 51/180 |
| 4,199,905 | 4/1980 | Neidigh | 51/180 X |
| 4,381,911 | 5/0383 | Bell | 51/102 |

Primary Examiner—Frederick R. Schmidt
Assistant Examiner—Bruce P. Watson
Attorney, Agent, or Firm—James E. Bradley

[57] ABSTRACT

A finishing machine will finish the surface texture of a concrete wall. The finishing machine has a frame with guide rails that will extend along one side of the wall. The frame extends up over the top of the wall. A wheel mounted to the upper section of the frame supports the guide rails and the frame. The wheel will roll along the top of the wall and is driven by an electric motor. A rotary drive head will rotate polishing stones for polishing the side of the wall. The lifting device will raise and lower the drive head on the guide rails.

1 Claim, 3 Drawing Sheets

CONCRETE WALL FINISHING MACHINE

BACKGROUND OF THE INVENTION

1. Field of the Invention

This invention relates in general to concrete finishing machines, and in particular to a machine for finishing the side of a vertical wall.

2. Description of the Prior Art

When constructing a vertical concrete wall, at times, one or both sides of the wall must be finished to a selected smoothness. Normally, this is handled by the use of polishing stones, water and a finishing mixture. Workers will rub the polishing stones over the surface while pumping a mixture of water and the finishing compound onto the wall. This polishing procedure is time consuming and tedious. Also, the smoothness may not always be uniform along the wall.

Proposals have been shown in various patents for equipment which will utilize a rotary motor to polish a side of a vertical wall. Generally, the devices have wheels which roll along the ground and a frame extending upward from the wheels. A rotary drive motor will be mounted to the frame for movement up and down the wall to handle the polishing. The frame may have a drive assembly for rolling along the ground.

To applicant's knowledge, these devices are not commercially available. One reason may be that the terrain around a newly-completed wall is often uneven and obstructed. It may be difficult to position vehicles alongside the wall for handling the polishing.

SUMMARY OF THE INVENTION

The apparatus of this invention has a frame with at least one vertical guide rail which extends along one side of the wall. A pair of wheels support the frame on top of the wall. A motor drives the wheels to roll the frame along the wall. A rotary drive means will slide up and down the vertical guide rail. The rotary drive means rotates a polishing pad or stone for rotary abrasive contact with the wall. A winch will raise and lower the rotary drive means along the guide rail.

Also, a pair of support legs extend downward from the upper frame for placement on the side of the wall opposite the side of the guide rails. Rollers are mounted to these support legs for support and contact with the opposite side of the wall. A biasing means urges the polishing pads against the wall. A tank will be mounted to the guide rails with a nozzle that points to the wall at a point close to the polishing pads. The tank will discharge a polishing solution onto the wall.

DESCRIPTION OF THE PREFERRED EMBODIMENT

Figure 1:
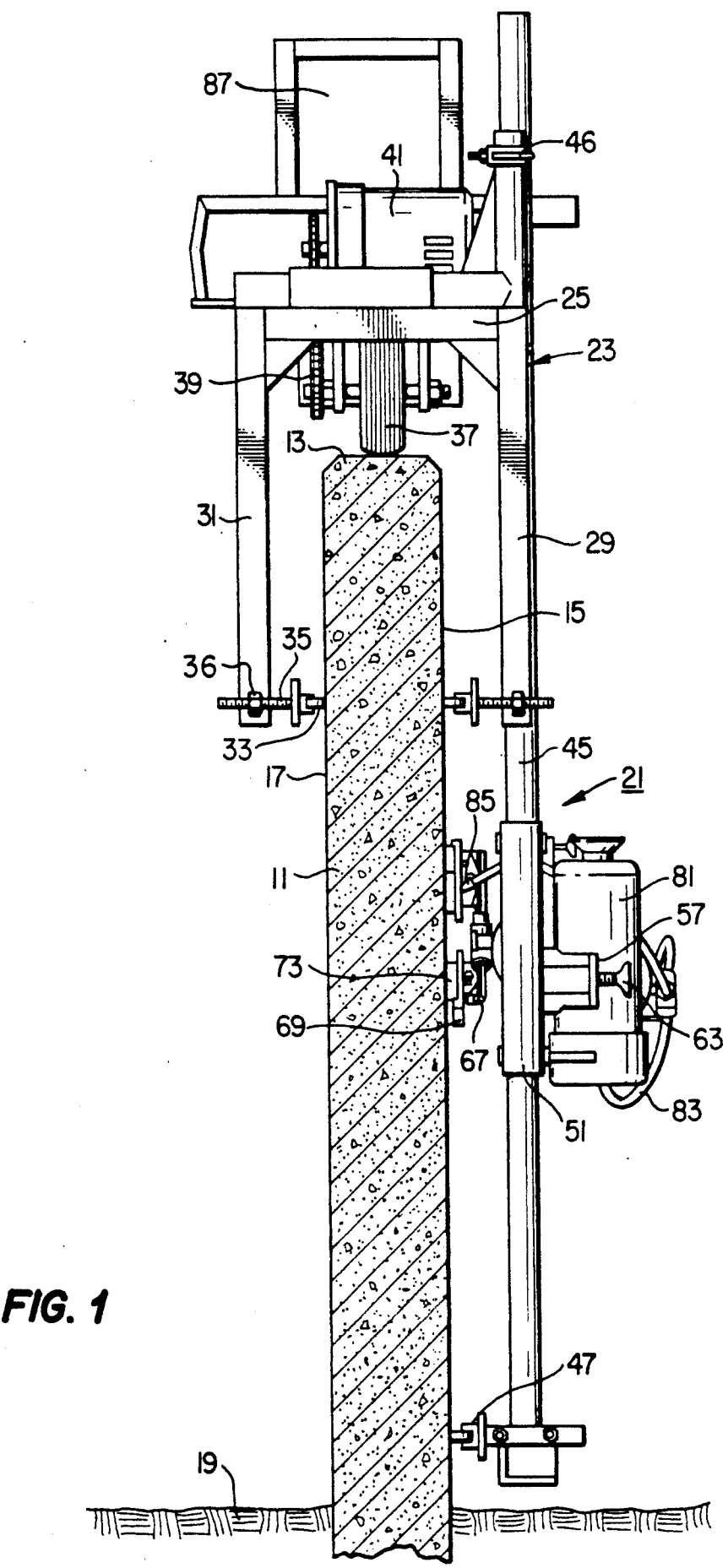
FIG. 1 is an end view, showing a concrete wall in vertical section, and illustrating an apparatus constructed in accordance with this invention.
Figure 2:
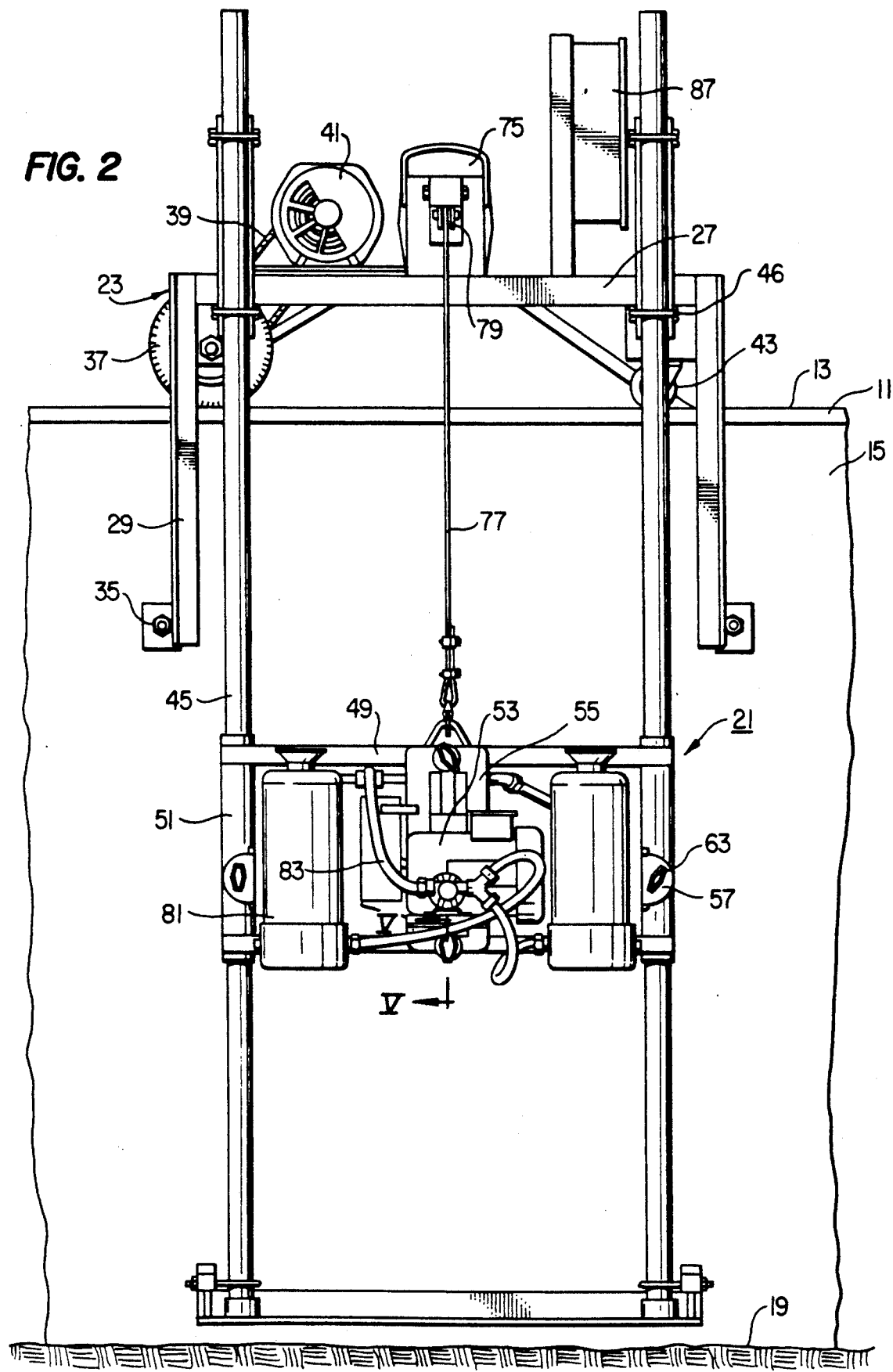
FIG. 2 is a side view of the apparatus of FIG. 1.

Referring to the FIGS. 1 and 2, a concrete wall 11 has a flat top 13. Top 13 will be perpendicular to the sides 15 and 17. The wall 11 will extend into ground 19 and be free standing.

A polishing apparatus 21 is shown in the process of finishing or smoothing side 15. Polishing apparatus 21 has a frame 23. The frame 23 includes a pair of upper transverse braces 25 (FIG. 1). Transverse braces 25 extend horizontally above the top 13. Transverse braces 25 are longer than the width of the wall 11 from side 15 to side 17.

Frame 23 also includes a pair of upper horizontal braces 27, shown in FIG. 2. Horizontal braces 27 connect the ends of the transverse braces 25, providing a rectangular upper section to the frame 23. The upper horizontal braces 27 are horizontal and extend along the length of the wall.

A pair of support legs 29 extend downward from each end of one of the horizontal braces 27 as shown in FIG. 2. The support legs 29 will be positioned adjacent to the side 15 of the wall 11. Also, a pair of support legs 31 (only one shown) extend downward from each end of the other horizontal brace 27 as shown in FIG. 1. The support legs 31 are identical to the support legs 29, but positioned to locate on the side 17 of wall 11.

A support roller or wheel 33 is mounted to the lower end of each of the support legs 29, 31. Each of the support rollers 33 has a threaded shaft 35 which engages a nut 36 secured to each of the support legs 29, 31. Shaft 35 can be rotated to move the rollers 33 inward and outward. This allows the rollers 33 to be adjusted for various wall 11 thickness. The threaded rods 35 will be adjusted so that all of the rollers 33 are in rolling contact with one of the sides 15, 17.

An upper drive wheel 37 transports the polishing apparatus 21 along the top 13 of wall 11. The drive wheel 37 is an elastomeric wheel. The drive wheel 37 is mounted on an axle and driven by a chain 39. An electric motor 41 rotates the chain 39 to drive the drive wheel 37. The drive wheel 37 will be located below the braces 25, 27.

A smaller roller or wheel 43 also supports the polishing apparatus 21, as shown in FIG. 2. Wheel 43 is positioned to roll along the top 13 of wall 11. Wheel 43 is considerably smaller than the drive wheel 37 and is not driven. Wheel 43 is also positioned beneath the braces 25, 27. It is located toward the rear of the horizontal braces 27, slightly forward of the rear support legs 29, 31.

A pair of guide rails 45 extend vertically downward from one of the horizontal braces 27. The guide rails 45 are spaced apart from each other, one located near each end of the horizontal brace 27. The guide rails 45 are located only on one side of the polishing apparatus 21. The guide rails 45 are preferably smooth, cylindrical tubes.

A bracket or clamp 46 mounts each guide rail 45 to the horizontal brace 27. Bracket 46 can be loosened to move the guide rails 45 up and down relative to the horizontal brace 27. The guide rails 45 are positioned so that they extend almost to the ground 21. The bracket 46 allows the guide rails 45 to be positioned for various heights of wall 11.

A guide roller 47 will be mounted to the lower end of each guide rail 45. The guide roller 47 rolls along the side 15 of the wall 11. The guide rollers 47 will maintain the guide rails 45 in a substantially vertical orientation, spaced slightly outward from the side 15 of wall 11.

A pair of horizontal frame members 49 will slide up and down on the rails 45. The horizontal frame members 49 comprises two horizontal braces spaced vertically apart from each other. The ends of the horizontal frame members 49 are connected to a pair of sleeves 51. The sleeves 51 are tubular members that slide on the guide rails 45. The horizontal frame members 49 and the sleeves 51 make up a mounting frame that is movable on the guide rails 45.

A rotary drive motor 53 is mounted to the horizontal frame members 49 and sleeves 51 The rotary drive motor 53 is secured to a vertical brace 55. The upper end of the brace 55 mounts to the upper horizontal frame member 49, and the lower end of the brace 55 mounts to the lower horizontal frame member 49. The rotary drive motor 53 is also mounted to a horizontal brace 57. Brace 57 extends from one sleeve 51 to the other sleeve 51. The rotary drive motor 53 is thus supported at four points, two of them at the sleeves 51, and two of them at the horizontal frame members 49.

Figure 5:
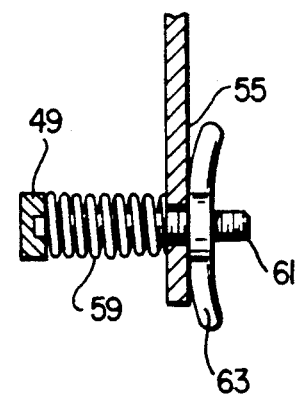
FIG. 5 is a sectional view of a portion of the apparatus of FIG. 1, taken along the line V—V of FIG. 2.

Referring to FIG. 5, each point will be mounted identically by a biasing and adjusting means. This includes a coil spring 59. A bolt 61 extends from one of the horizontal frame members 49 out through a hole in the vertical brace 55. A wing nut 63 can be tightened to selectively compress the spring 59. Tightening the wing nut 63 will move the motor vertical brace 55 inward and outward relative to the horizontal frame member 49. The other points for the motor braces 55 and 57 are the same as shown in FIG. 5.

Figure 3:
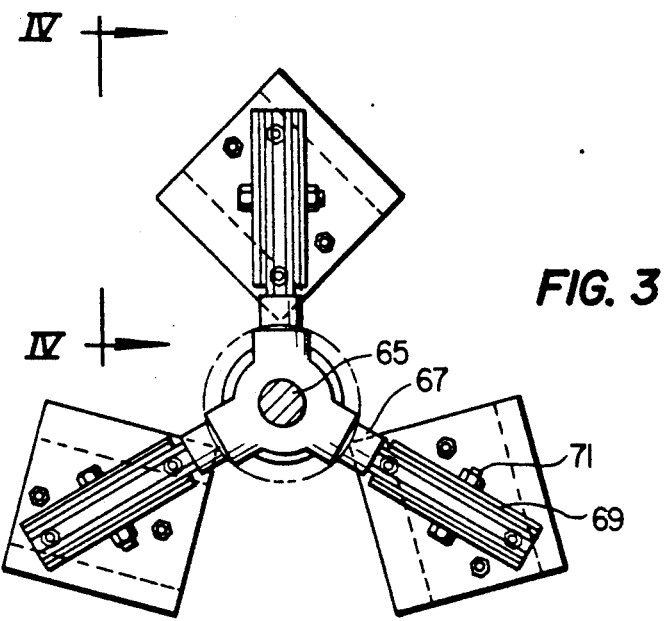
FIG. 3 is a front view of the polishing arms for the apparatus of FIG. 1.

Referring to FIG. 3, the rotary drive motor 53 will include a right angle gear box (not shown) which will reduce the speed of an output shaft 65 greatly. The output shaft 65 extends directly inward toward the wall side 15. Three arms 67 extend radially outward from the drive shaft 65. Arms 67 will be positioned 120 degrees apart from each other.

Figure 4:
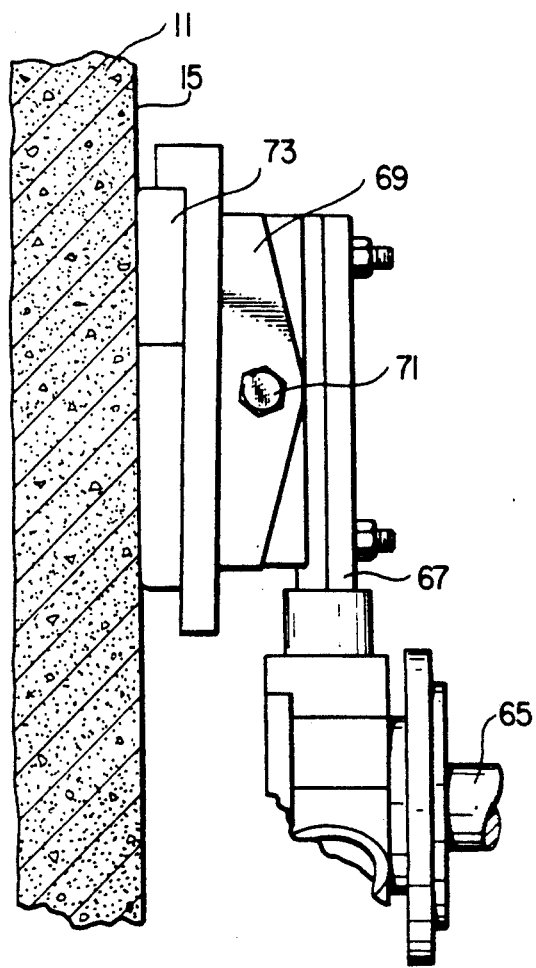
FIG. 4 is a sectional view of one of the polishing arms of FIG. 3, taken along the line IV—IV.

A bracket 69 locates at the end of each arm 67. As shown in FIG. 4, each bracket 69 connects to an arm 67 by means of a pivot pin or bolt 71. The pivotal bolt 71 allows the bracket 69 to rotate or pivot about the axis of the bolt 71. The axis of each bolt 71 will be transverse to a radial line passing through the arm 67 from the shaft 65. A conventional polishing stone 73 will be mounted to the bracket 69. The polishing stone 73 is positioned to engage the wall side 15.

Referring to FIG. 2, a winch 75 will raise and lower the rotary drive motor 53. Winch 75 is mounted to the upper section of the frame 23, between the two horizontal braces 27. Winch 75 has a cable 77 that plays out over a pulley 79. The cable 77 attaches to the upper horizontal frame member 49. The winch 75 will move the entire assembly including the sleeves 51, horizontal frame members 49, and rotary drive motor 53 up and down.

Referring still to FIG. 2, a pair of tanks 81 will be mounted to the horizontal frame members 49. The tanks 81 contain a mixture of water and a finishing compound. Each tank 81 has a hose 83. The hoses 83 terminate in a nozzle 85, shown in FIG. 1. Nozzle 85 locates adjacent to the polishing stones 73. A pump (not shown) can be selectively activated to spray the solution onto the wall side 15.

Referring to FIG. 2, a control panel 87 will be mounted to the frame 23 at the upper horizontal braces 27. The control panel 87 will be supplied with AC power. A control line (not shown) will extend downward from the control panel A control assembly (not shown) will be mounted to the lower end of the control line to be held by a worker. The control assembly will have a series of buttons for controlling the various operations of the polishing apparatus 21.

In operation, the apparatus 21 will be positioned on the wall 11 as shown. A lifting device, such as a small crane or forklift will be used to place the frame 23 on the wall 11. The operator will adjust the support rollers 33 so that two of them are in contact with the side 15, and two of them in contact with the side 17. The operator will actuate the winch 75 to place the rotary drive motor 53 at the desired starting position on the side 15. Once power is supplied to the rotary drive motor 53, it will rotate the polishing stones 73 (FIG. 1). The operator selectively actuates the valves for the tanks 81 to distribute a solution onto the side 15. As the apparatus polishes, the operator will control the winch 75 to gradually lower the rotary drive motor 53.

When the rotary drive motor 53 reaches the lower ends of the guide rails 45, he will then actuate the winch 75 to pull the rotary drive motor 53 back to the upper portion of the wall side 15. At the same time, he will supply power to the drive motor 41. This rotates the drive wheel 37, causing the entire polishing apparatus 21 to move along the wall to a new position. He will then repeat the process. Once he completes the side 15, the assembly can be picked up and placed back on the wall for polishing side 17 in the same manner.

The invention has significant advantages. It eliminates tedious manual labor involved in finishing a vertical concrete wall. It provides a more uniform and attractive appearance than hand finishing. As it moves along the wall by roller on top of the wall, uneven terrain below the wall does not cause problems.

While the invention has been shown in only one of its forms, it should be apparent to those skilled in the art that it is not so limited but is susceptible to various changes without departing from the scope of the invention.

I claim:

1. An apparatus for polishing a first side of a concrete wall of a type having a flat top, comprising in combination:

a frame having an upper section;

a pair of spaced apart support legs extending downward from the upper section of the frame for positioning on a first side of the wall;

a pair of spaced apart support legs extending downward from the upper section of the frame for positioning on a second side of the wall opposite the first side;

a support roller mounted to each of the support legs and extending inward for rolling contact with the one of the sides of the wall;

adjusting means for adjusting the distance that the support roller extends inward from the support leg, comprising a threaded rod threaded into a threaded receptacle on each of the support legs;

a pair of spaced-apart vertical guide rails mounted to and extending downward from the upper section, the guide rails having lower ends adapted to terminate a selected distance above the ground;

a guide roller mounted to the lower end of each guide rail for rolling contact with the first side of the wall;

a pair of wheels rotatably mounted to the upper section of the frame for rolling contact with the top of the wall and for supporting the weight of the frame;

a drive motor means mounted to the upper section of the frame for driving one of the wheels along the top of the wall to move the frame along the wall;

a rotary drive means having a plurality of polishing pads for rotary abrasive contact with the first side of the wall;

a mounting frame slidably mounted to the guide rails for vertical movement along the guide rails;

a brace to which the rotary drive means is mounted, the brace having a plurality of apertures;

a plurality of bolts connected to the mounting frame, each extending outward through one of the holes in the brace;

a coil spring encircling each of the bolts and compressed between the mounting frame and the brace;

a nut secured to each bolt to a selected tightness for compressing the springs to select the distance that the pads extend inward from the guide rails and for biasing the pads against the first side of the wall; and a winch mounted to the upper section of the frame and having a cable that extends downward to the mounting frame for raising and lowering the mounting frame.

* * * * *